(12) United States Patent
Samid

(10) Patent No.: US 11,038,668 B2
(45) Date of Patent: Jun. 15, 2021

(54) TRANSPOSITION ENCRYPTION ALPHABET METHOD (TEAM)

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/821,944

(22) Filed: Mar. 17, 2020

(65) Prior Publication Data
US 2020/0287705 A1  Sep. 10, 2020

Related U.S. Application Data

(63) Continuation-in-part of application No. 14/714,328, filed on May 17, 2015, now Pat. No. 10,608,814.

(60) Provisional application No. 62/963,855, filed on Jan. 21, 2020, provisional application No. 62/931,807, filed on Nov. 7, 2019, provisional application No. 62/926,560, filed on Oct. 27, 2019, provisional application No. 62/900,567, filed on Sep. 15, 2019, provisional application No. 62/857,898, filed on Jun. 6, 2019, provisional application No. 62/850,720, filed on May 21, 2019.

(51) Int. Cl.
*H04L 9/06* (2006.01)
*H04L 9/08* (2006.01)

(52) U.S. Cl.
CPC .......... *H04L 9/0618* (2013.01); *H04L 9/0819* (2013.01); *H04L 9/0838* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 6,038,317 A | * | 3/2000 | Magliveras | H04L 9/302 380/28 |
| 7,450,717 B1 | * | 11/2008 | Sprunk | H04L 9/0618 380/255 |
| 7,747,011 B2 | * | 6/2010 | Shirai | H04L 9/14 380/28 |
| 2009/0103716 A1 | * | 4/2009 | Shirai | H04L 9/002 380/28 |
| 2010/0002872 A1 | * | 1/2010 | Shibutani | H04L 9/002 380/28 |
| 2010/0211787 A1 | * | 8/2010 | Bukshpun | H04L 9/065 713/170 |
| 2012/0027201 A1 | * | 2/2012 | Fujisaki | H04L 9/3073 380/28 |

* cited by examiner

*Primary Examiner* — Kenny S Lin

(57) ABSTRACT

This invention is a system and a method to encode an arbitrary digital string, as a sequence of q-bits subsections thereto, and expressing the possible $2^q$ strings with an alphabet A, comprised of $2^t$ letters where t<q, using letter repetition. This encoding makes it possible to build any desired security level (up to perfect secrecy) through a single round of transposition. Vulnerability is credibly appraised through probability calculus; computational complexity is avoided, and the user assumes control over the measure of security associated with their transmission.

3 Claims, 5 Drawing Sheets

TEAM Configuration

TEAM Configuration

Transposition Specific Integrated Circuitry (a)

Transposition Specific Integrated Circuitry (b)

Transposition Specific Integrated Circuitry (c)

Buying Security with Processing Effort

Fixed Size TSIC

Mode B TSIC with three Security Levels

Unary/Hybrid Packaging

TRANSPOSITION ENCRYPTION ALPHABET METHOD (TEAM)

This figure describes a configuration where the TEAM operation is divided between software sitting in the computer, and the secure part sitting on a USB stick to be attached to the computer when needed. The USB stick, is activated biometrically by its owner, and is called the biometric TEAMkit. It may contain a TSIC (transposition specific integrated circuit) to effect a fast and efficient transposition and reverse transposition. The figure describes two modes Mode A where the biometric TEAM kit only performs the transposition and the reverse-transposition. In mode B the biometric TEAMkit performs the encoding and decoding to and from hybrid or unary text, in addition to the transposition and reverse transposition.

Figure 1:
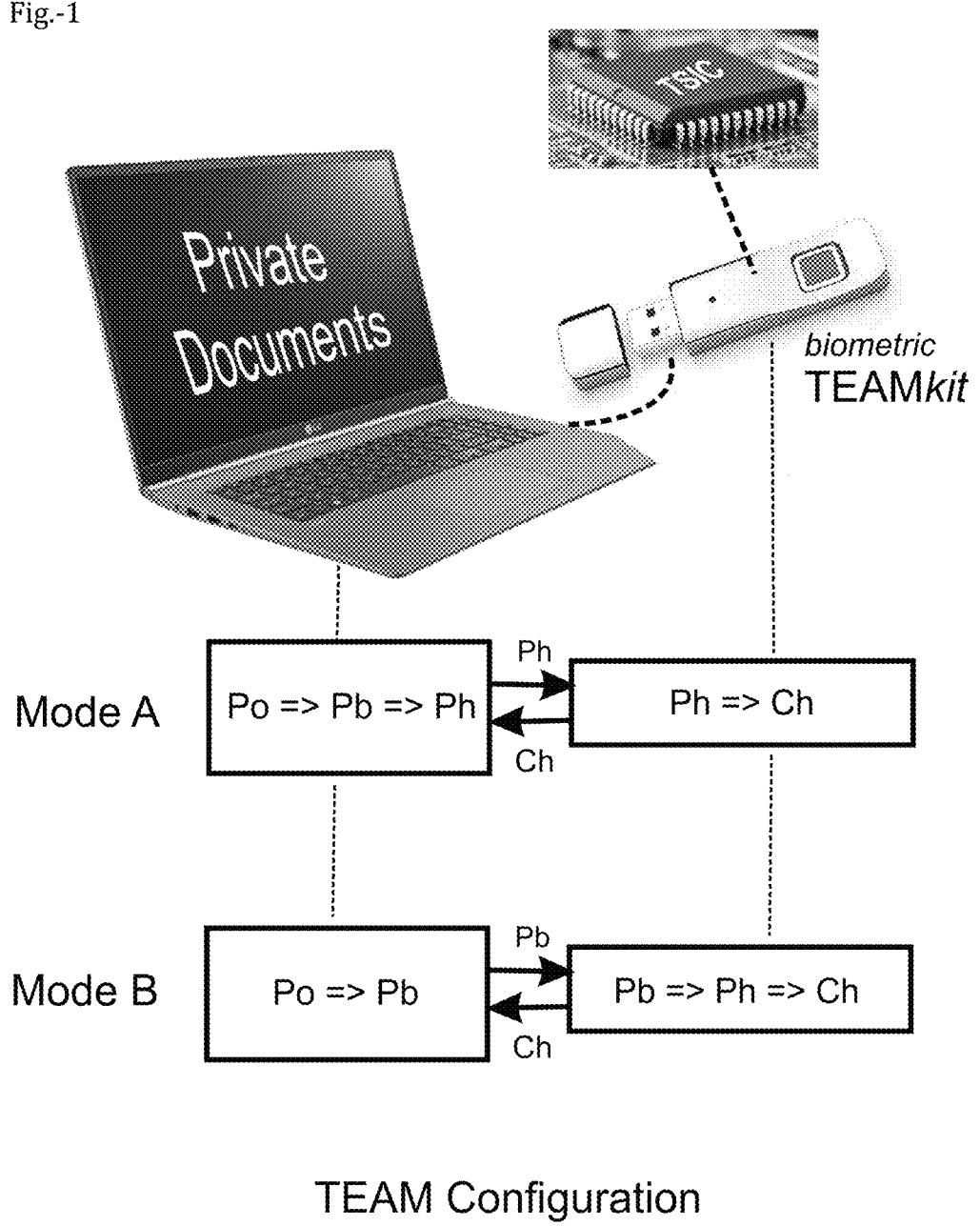
FIG. 1 TEAM Configuration
Figure 2:
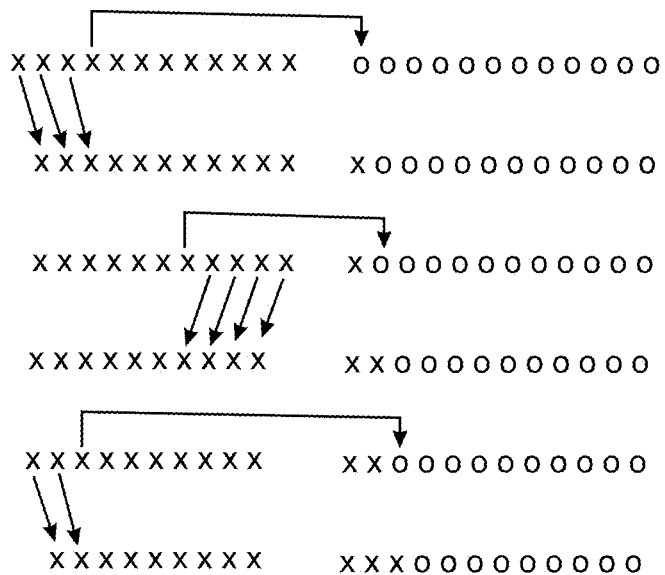

FIG. 2: Transposition Specific Integrated Circuitry (a)

The figure shows the operation of TSIC (transposition specific integrated circuitry). The pre-transposition list is depicted as a series of "x" signs, where "x" represents a bit of either identity. The post-transposition list on the right is depicted as a series of "o" to begin with, where "o" represents a spot for a bit which is not yet filled. In other words in the beginning of the operation the left series if all empty ("0"). The figure shows the beginning with the top line. The 4th bit from the left is chosen to be transferred from the "shrinking list" to the "growing list" (left to right). The second line below that shows how the 3 bits left to the removed bit are all shifted to generate a smaller list of bits without "holes". Then the figure shows the 5th bit from the right being selected to be removed to the 2nd position in the "growing list", and then the 4 bits right to it, are being shifted one position to the left to generate a still shorter list of bits—contagious. Then the figure shows the 3rd bit from the left is being removed to the 3rd spot in the 'growing list', and two bits to its left are being shifted to the right to generate the still smaller contiguous string. This process continues until all the elements in the "shrinking list" are being transformed to the "growing list".

Figure 3:
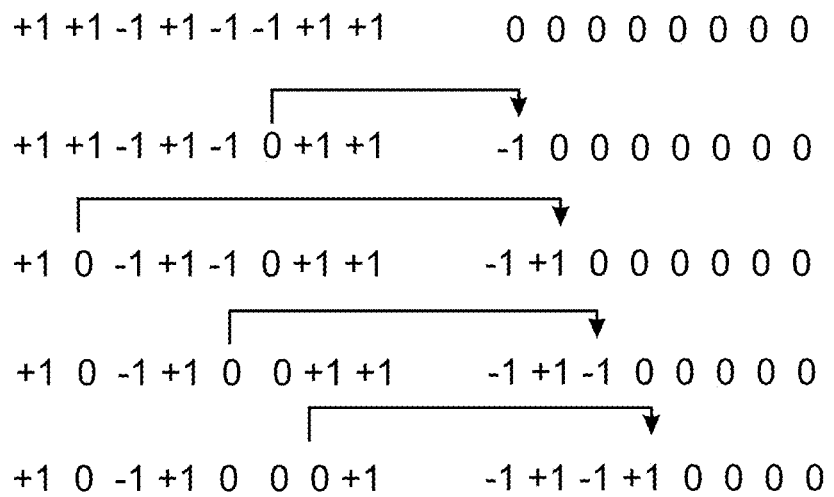

FIG. 3: Transposition Specific Integrated Circuitry (b)

This figure shows a TSIC implementation where bits of identity "1" are represented as a positive charge "+1", and bits of identity "0" are represented as a negative charge "−1". No charge—no bit in that location is represented as "0". Accordingly the shrinking list on the left starts as a series of "+1" and "−1" while the growing list starts (upper line) as a series of empty spots "0". When a bit is moved from the shrinking list to the growing list, the spot in the shrinking list becomes "0" (no charge), and the first spot in the growing list becomes "+1" or "−1" as the case may be. The figure shows the first 4 bits moved one by one from the shrinking list to the growing list. This operation will work the same for groups of bits or other entities marked as +1, +2, . . . and −1, −2, . . . with "0" representing 'empty spot'.

Figure 4:
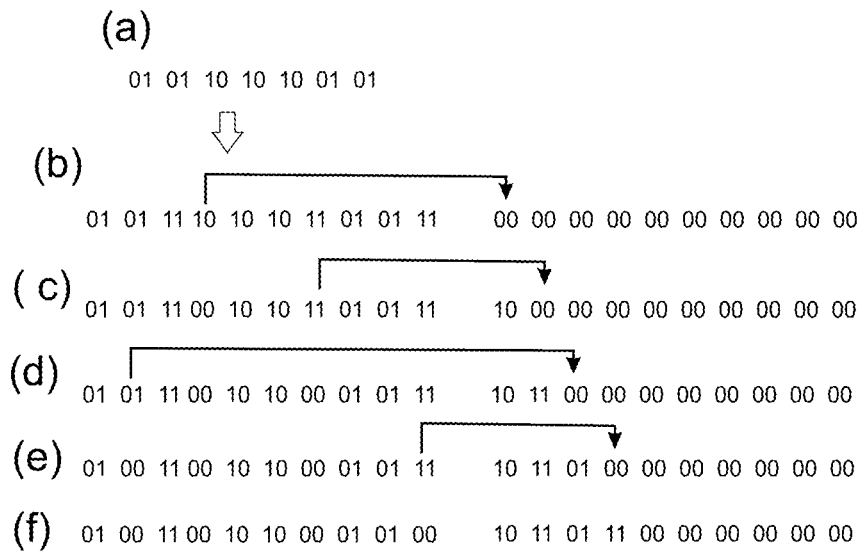

FIG. 4: Transposition Specific Integrated Circuitry (c)

This figure shows the use of a pair of bits to effect the transposition operation. a zero bit is written as 01, a "one" bit is written a 10, the pair 00 represents an empty spot where bit can reside, and the "ghost" which is defined in the continued application is represented as the pair "11". The figure shows how the original list (a) comprised of "01" and "10" pairs, is augmented with 'ghosts' represented as "11: (b). This is the shrinking list positioned opposite the growing list that in the beginning is marked with a series of "00" pairs (all empty). The figure then shows the next state (c) where the 4th pair from the left is changed of "10" to empty "00" and the "10" pair moves to the first position in the growing list. The figure then shows the next action in which a 'ghost' is moved from the shrinking list to the growing list, and then another bit and another as the states of the shrinking and the growing lists are adjusted through the lines marked (d), (e) and (f). By the end of the process the shrinking list will be marked all with pairs of "00" and the original list (in the left string) is passed to the growing list in some different order (ghosts included, but subsequently removed).

Figure 5:
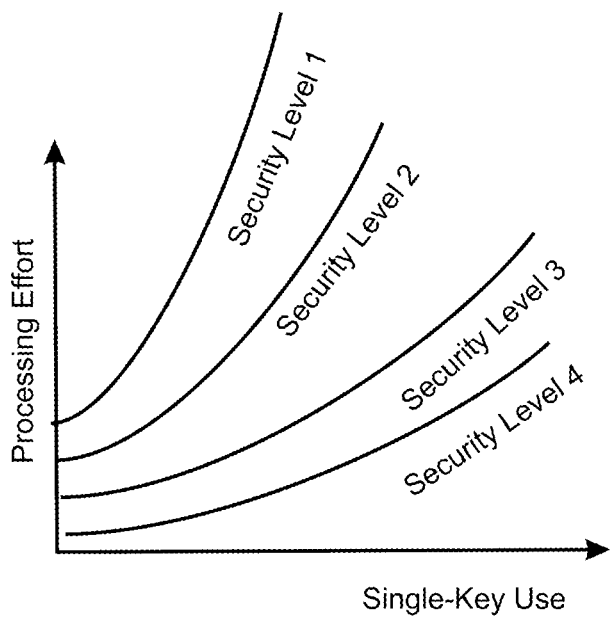

FIG. 5: Buying Security with Processing Efforts

This figure shows a depiction of the idea that security can be maintained at desired levels, even though a single key is kept in use. This maintained security is achieved via increased computation efforts and via handling an ever larger ciphertext. The figure shows 4 levels of security, where for each the required additional effort for continuing use is growing higher and higher. The figure also depicts tacitly the idea that by keeping the same encryption/decryption effort using the same TEAM key, one gradually loses security.

Figure 6:
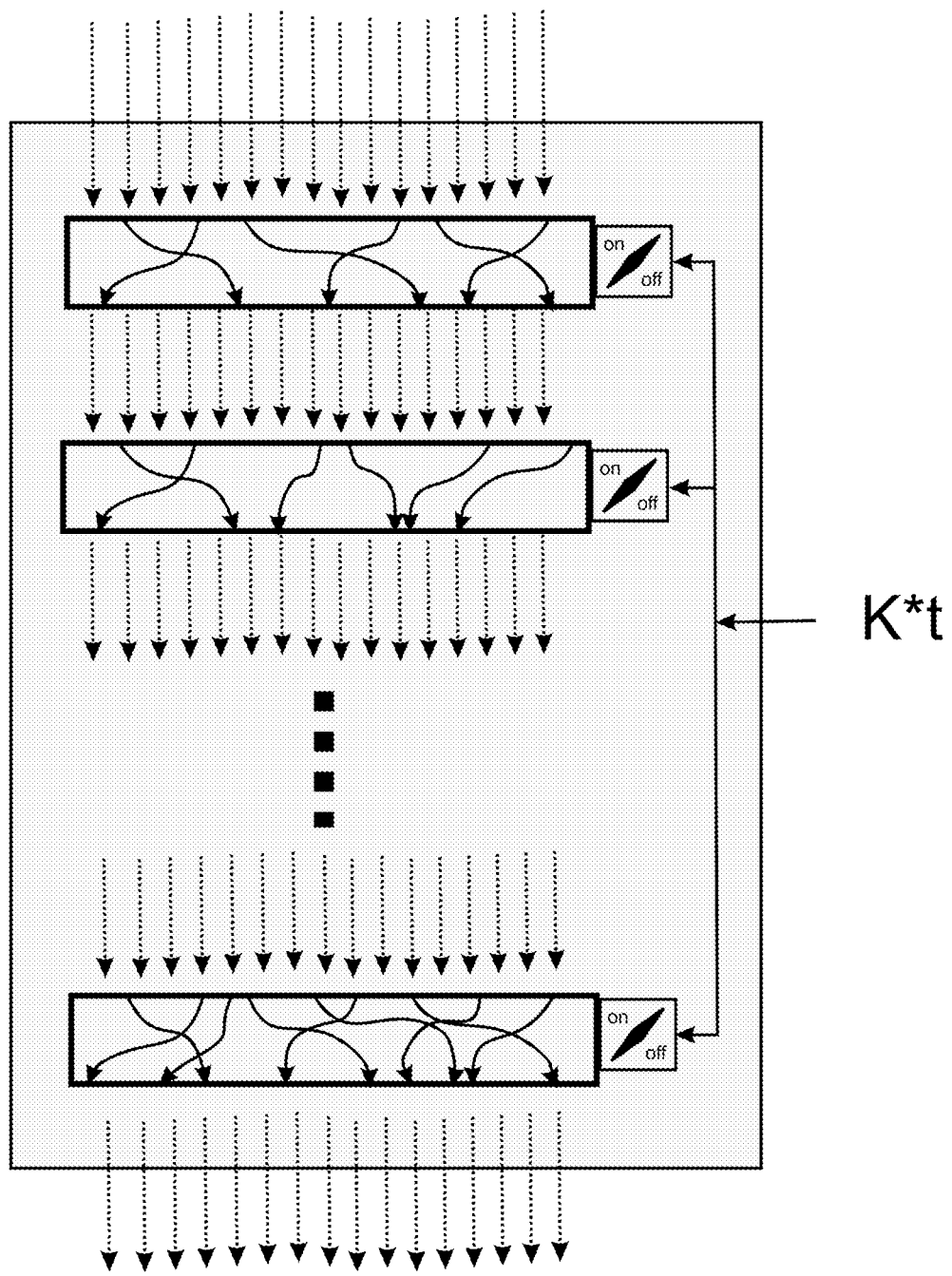

FIG. 6: Fixed Size TSIC

The figure shows a TSIC based on pre-wired fixed size transposition. Namely it works on a pre-determined list of fixed size n. The n elements of the list go in as input in one order and go out as output in a different order. In between there are many pre-wired settings that effect a transposition of n listed entities. The series of pre-wired transposition may each be either activated, or by-passed. The determination as to which pre-wired transposition unit is activated and which is by-passed is determined by another input into the TSIC— that is the transposition selection key, marked as K*t. K*t may be changed before each transmission, and may be pre agreed by the parties, or communicated between parties in the open (because the content of the pre-wired transposition units is not disclosed), or it may be changed confidentially by marking the next value of K*t as part of the encrypted plaintext of the current transmission. The more transposition units in the TSIC chip the more variety for K*t. There are 2" distinct values for K*t over u pre-wired transposition units.

Figure 7:
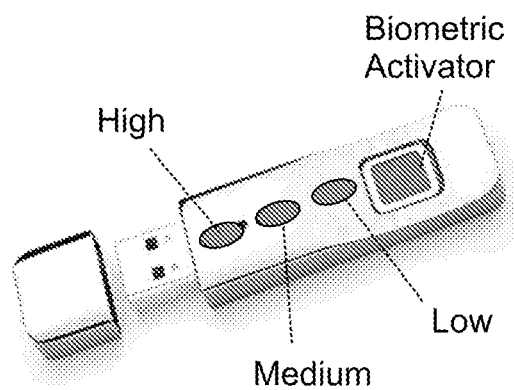

FIG. 7: Mode B TSIC with Three Security Levels

The figure shows a USB stick containing the TEAM transposition TSIC, fitted with a bio-activator (fingerprint reader), and three security levels buttons where the user can indicate how much security to generate for the encryption at hand. The "high" mode will create a large η value—a ciphertext much larger than the plaintext. In other words the selected encoding will allow for a great expansion. The "low" mode will guide the unit to use encoding with a small value of expansion ration, η. And the "medium" is an in between state. The selection of encoding message will eventually be indicated in the meta data (the header) that goes with the payload (the ciphertext).

Figure 8:
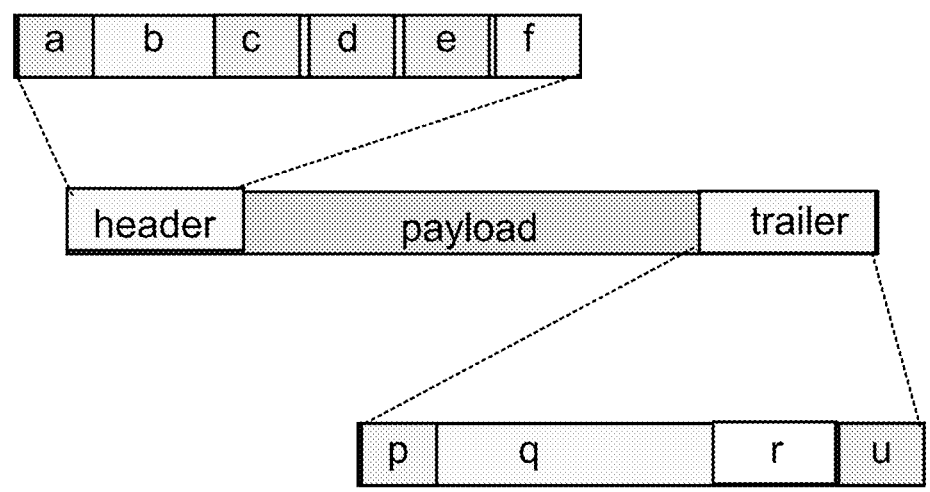

FIG. 8: Unary/Hybrid Packaging

This figure shows how the payload (the ciphertext) is wrapped by a header and a trailer. The header has 6 elements: (a). message start signal (b). sender id, time of transmission, open fields (c). encoding data (d). transposition key indicators (e). payload size (f) header end indicator The trailer is identified with four elements: (p). trailer start indicator (q). Transmission history (r). signature (payload hash/header hash) (u). end of trailer indicator.

A bit string conveys information in two ways: (i) through the identity of its bits, and (ii) through the count of its bits. While the first method is the norm, the second method comes with a fundamental advantage: it allows one to use the identity of the bits for another purpose. A hybrid string will carry information in a combined fashion. Hybrid strings have the mathematical property of effectively concealing their information content under the simple operation of transposition. Therefore, there is no need to a mass the complicated floating points calculation practiced in today's ciphers. Moreover, the user may adjust the hybrid encoding to project at will security, all the way up to mathematical perfection: buying security with a larger ciphertext. The simplicity of the cryptographic operation—transposition—offers a critical advantage to its users: cryptanalytic vulnerability is credibly estimated, through probability calculus. No need to rely on unproven assumptions of 'algorithmic hardness' which is the Achilles Heel of today's cryptography.

INTRODUCTION

Presenting a novel cryptographic thesis: "Buying Security with Computational Effort". The consumers of security are given the power to decide how much they wish to pay for it, where the payment is expressed as computational burden. The digital coin, bitcoin, is kept "afloat" by consistently upgrading the computational burden for mining new coins and certifying recent transactions. Similarly, introducing a cipher, which can be used with low computational effort to begin with. But as the same key is used again and again, then, in order to maintain the same security level, the user will have to increase the required level of computation. To the extent that the constant-security computational level is not maintained, that is the extent that security deteriorates. It is up the user, though. They know how sensitive each encrypted message is, and they are in the best position to determine how much effort they are prepared to exert to achieve a desired level of security.

There are several known ciphers that allow this use paradigm (e.g. U.S. Pat. Nos. 6,823,068, 10,541,808). This here is another example. It is based on "hybrid encoding" of a binary string, $P_b$, into an encoded version $P_h$. The bit count of $P_h$ is generally larger than the bit count of the pre-encoded version of the plaintext, $P_b$. Defining η as the size ration between the two encoding of the plaintext: $η=|P_h|/|P_b|$, we write:

$$2 \leq η \leq 2^{|P_b|}$$

this is a big range. The communicating parties would need to use ever larger values of η to maintain the same level of security. Large values of η are associated with exponentially mushrooming computational efforts, therefore the parties would attempt to switch to another key so they can come back to small values of η—small increase in the size of the encrypted plaintext. Presenting also several ways to dynamically switch the key so that one is spared the need to go for overly high η values.

The unique feature of this cipher is that it is based solely on the most primitive, most historic, cryptographic operation: transposition. Showing that there is no need for more encryption action, transposition all by itself creates the highest level of security (Vernam, or Shannon grade). This fact calls for Transposition-Specific Integrated Circuitry which take on the load of complete transposition of a large list of items, where the notion 'complete' means that it is open to generate any of the n! permutations of an n items list.

In summary TEAM is a cipher that places the choice for security level in the hands of the users, and offer them the option to decide how much computational burden they are willing to pay for gaining a desired level of security. This computational burden is comprised of the burden to execute a transposition of bit string, and the communication burden of communicating a ciphertext which may be much larger than the plaintext.

Unary Encoding and Encrypting

Let B be an arbitrary bit string. Let us slice B to t-size strings (t bits per substring). There are $2^t$ distinct possible t-bits strings. Each of these strings may be interpreted according to its integer value. So an integer value, v, from 0 to $2^t-1$ will be associated with one of the $2^t$ strings.

The first t-bits size (letter size) string in B will be associated with integer $v_1$ as indicated by the binary arithmetic system: "11" is 3, "110" is 6, etc. We shall encode $v_1$ with a string of $v_1+1$ concatenated zeros: 000 . . . 0. The second letter in B evaluates to integer $v_2$. Accordingly we will concatenate next to the $v_1+1$ zeros $v_2+1$ ones: 000 . . . 0111 . . . 1. The third letter in B evaluates to integer $v_3$. Accordingly we will concatenate $v_3+1$ zeros to the combined encoding of the first and second letter in B.

This procedure will be continued until B is exhausted. We will assume here that B=0 MOD t, so that the last string in B has t bits. We shall address later how to handle the case where such assumption does not hold.

The concatenated string comprised of the alternating substrings of zeros and ones will be referred to as U. It is clear that there is a bijection between B and U. Each one completely defines the other. However U has a larger bit count: |U|>|B|. We regard U as unary encoding of B.

Let TRC represent a Complete Transposition operation applied on an input list of n elements, and conducted on a basis of a key, $K_t$, where every one of the possible n! permutations is associated with a value for the key that will transpose the input list into the indicated permutation. U.S. patent application (continued by this application) Ser. No. 14/714,328 describes such a method.

We now define a proper user of TRC as a user who selects a specific key k from the key space K, with a probability of 1/|K| where |K| is the size of the key space.

Let O be the output permutation of applying TRC with a key k on an input permutation I:

$$O=TRC(I,K_t)$$

If O was generated from I by a proper user as defined above, then knowledge of I along with lack of knowledge of $K_t$, will make any of the less than $2^n$ possible permutations of O into an equally likely candidate to have been the input permutation I that generated O.

We are ready now to introduce the fundamental theorem of unary text encryption:

Given a sufficiently long bit string B, regarded as plaintext, then expressing B in a unary encoding U based on some arbitrary value oft $U=U_t$, then applying a proper complete transposition on U to generate T: $T=TRC(U,K_t)$, then a cryptanalyst in possession of T has no cryptanalytic advantage over another cryptanalyst in possession only of the size of T: |T|. T is regarded as the respective ciphertext.

In other words, knowledge of the content of T offers no advantage over the knowledge of the size of T, |T|.

The term 'sufficiently long' implies asymptotic claim.

Proof.

A sufficiently long plaintext, will have a Hamming weight approaching |U|/2. Namely the number of zeros will be very similar to the number of ones. This is on account of how U is constructed where ones and zeros alternate from letter to letter. Note: while above the construction of U started with zeros, it could have equally started with ones.

The average bit size of a string that represents a letter in the unary alphabet will be $2^{t-1}$. (the average of the range from 1 to $2^t$). Therefore the ratio between the size of U and the size of B will asymptotically approach the ratio between the average bit size of a unary letter and fixed bit size, t, of a B letter:

$$\eta = |U|/|B| = 2^{t-1}/t$$

Let B'≠B be an arbitrary string of size $|U|/\eta=|T|/\eta$. Let U' be the unary encoding of B'.

As constructed the size of U and the size of U will approach equality: $|U'| \rightarrow |U|$. Hence the Hamming weight of both strings will approach equality: $Hamm(U') \rightarrow Hamm(U)$. Namely there is a transposition key k' such that:

$$TRC(U', K'_t) \rightarrow U$$

We can write then:

$$T = TRC(U, K_t) = TRC(TRC(U', K'_t), K_t) = TRC^2(U', K'_t, K_t) = TRC(U', K''_t)$$

where $K''_t = f(K_t, K'_t)$. In other words, there exists a key $K''_t$ such that U will be transposition of T.

The above articulated logic applies to any plaintext B'≠B, of size $|B'| \rightarrow |B|$ and hence knowledge of T offers no cryptanalytic advantage over knowledge of the size of T only. Which is what the theorem claims.

While for practical size strings B, this asymptotic assurance is progressively diluted, it still maintains a large measure of equivocation. The level of vulnerability on a given size B, and on a given number of re-use instances of the same transposition key is computable on sound probability calculus, so the user is aware of their vulnerability and can manage their security accordingly.

Note: in practice the user may randomly choose whether to start the unary encoding with zeros or ones.

"Wild" Version of Unary Encoding

In the above analysis the two communication partners pre agree of mapping a binary string B through sections oft bits each. However such pre-agreement on a value oft is not necessary. The transmitter may arbitrarily divide B to sections: $B = b_1 \| b_2 \| b_3 \ldots$ of varying bit count, then encode each $b_i$ section in the unary fashion. Namely a substring $b_i$ representing integer value $v_i$ will be encoded by a string of $(v_i+1)$ ones or a string of $(v_i+1)$ of zeros. The size of each list of ones or zeros that encodes each $b_i$ will be counted by the recipient who will readily express that value (minus one) in the binary way, which is the $b_i$ string.

To practice this "wild" version of unary encoding, the transmitter will send the recipient a package of bits comprised of: header—payload—trailer. The header will identify the message in a desired way. Like specifying the identity of the sender, if necessary, the identity of intended recipient, time of dispatch, topic, etc. The header will include a count of bits of the payload. Where the payload is the string of bits that expresses the wild unary encryption. The header will conclude with an agreed upon 'header concluding substring'. Followed that substring, the payload will be presented with the exact count of bits specified by the header. The payload will be followed by a trailer that may include any desired meta information regarding the transmission. The trailer will commence with an agreed upon trailer commencement substring, and will conclude with a trailer conclusion substring.

The payload is the only part of the transmission that undergoes transposition, the header and the trailer are passed on as is.

This way the recipient of the package consists of header-payload-trailer will be able to identify the payload and decrypt it.

As a matter of good practice the transmitter will vie for an equal, or close to equal, number of ones and zeroes.

Limitation: wild-unary strings to be encoded must begin with 1 because the method will not communicate leading zeros. This limitation implies that a string of zeros in B cannot be communicated using the wild method. In order to overcome this limitation one can opt for "advanced 'wild' unary encoding"

Advanced 'Wild' Unary Encoding

Given an arbitrary bit string B, arbitrarily divided to consecutive subsections $b_1 \| b_2 \| \ldots \| b_n$, let $v_1, v_2 \ldots v_n$ represent the integral value of the n $b_i$ substrings (i=1, 2, ... n). Let $r_i$ represent the number of leading zeros in substring $b_i$.

In order to transmit B, a transmitter would construct two bit strings, $B_v$, and $B_r$ as follows:

$B_v$ will be constructed by setting up $(v_1+1)$ zeros, followed by $(v_2+1)$ "ones" ("1"), then followed $(v_3+1)$ zeros, and so on for i=1, 2 ... n, build $B_v$ from alternating zeros and ones, where the count of each zero-bit substring and one-bit substring reflects the digital value of the respective, $b_i$ in B. (plus one).

$B_r$ will be constructed by setting up $(r_1+1)$ zeros, followed by $(r_2+1)$ "ones" ("1"), then followed $(r_3+1)$ zeros, and so on for i=1, 2 ... n, build $B_r$ from alternating zeros and ones, where the count of each zero-bit substring and one-bit substring reflects the count of leading zeros in the respective, $b_i$ in B (plus one).

The transmitter will then transpose both $B_v$ and $B_r$ with complete transposition:

$$C_v = TRC(B_v, K_t); C_r = TRC(B_r, K_t)$$

$C_v$ and $C_r$ combine to be regarded as the uTEAM ciphertext $C = \{C_v, C_h\}$. C will be transmitted to the intended recipient who will reverse transpose C (using the shared $K_t$) to $B_v$ and $B_r$.

The recipient will then process $B_v$ and $B_r$ to recreate B. As follows:

The recipient will first count the number of consecutive zero at the start of $B_v$, then write in binary arithmetic the number of these zeros minus one, this will be $v_1$. Then the recipient will count the number of zeros at the start of string $B_r$, that number minus one is $r_1$—the number of leading zeros in $b_1$. The intended recipient will then place $r_1$ zeros left of the binary expression of $v_1$, and thereby the substring $b_1$ will be fully constructed.

Similar procedure will be applied to the all the subsections of B and thereby B will be fully recreated at the intended recipient side.

Specifically for subsection $b_i$ the recipient will count the number of consecutive zeros (or ones) in the i-th substring in $B_v$ (where $B_v$ is seen as composed of n consecutive substrings each substring comprised either of all zeros or of all ones). Then the recipient writes in binary arithmetic the number of bits in this i-th substrings minus one, this will be $v_i$. Then the recipient will count the number of bits in substring i in string $B_r$, that number minus one is $r_i$—the number of leading zeros in $b_i$. The intended recipient will then place $r_i$ zeros left of the binary expression of $v_i$, and thereby the substring $b_i$ will be fully constructed.

Illustration: Let's consider B=001100110100010. Parcelled out as follows: $b_1$=00110 $b_2$=01 $b_3$=101 $b_4$=00010. Accordingly we write:

| # | $r_i$ $v_i$ ... $b_r$ ... $b_v$ |
|---|---|
| 1 | 2 6 ... 000 ... 0000000 |
| 2 | 1 1 ... 11 ... 11 |
| 3 | 0 5 ... 0 ... 000000 |
| 4 | 3 2 ... 1111 ... 111 |

So the unary encoding of B=001100110100010 is captured in the two strings $B_v$ and $B_r$ as follows:
$B_v$=00000001100000111
$B_r$=0001101111

Each of these two strings will be transposed by the shared transposition key to form the two string $B_v \rightarrow C_v$, and $B_r \rightarrow C_r$, that together form the ciphertext.

for example, with a transposition key Kt-44 (no ghosts) we have:
$B_v \rightarrow C_v$: 00000011000000111 → 110000000100000110
$B_r \rightarrow C_r$: 0001101111 → 1011010011

Consolidation Option.

The two string $B_v$ and $B_r$ may be consolidated to one string by setting up an agreed upon order:

$\|v_1+1 \text{ "0"} \| r_1+1 \text{ "1"} \| v_2+1 \text{"0"} \| r_2+1 \text{"1"} \| \ldots \| v_i+1 \text{ "0"} \| r_i+1 \text{"1"} \| \ldots \| v_n+1 \text{ "0"} \| r_n+1 \text{ "1"} \|$ So if B=011000011110 divided to four 3 bits size sections: B=011 000 011 110, then it would be encoded as:

$B_h$=000011 01111 000011 00000001

This mode has a certain advantage for short plaintexts, making it easier to construct encoded strings with a 50% Hamming weight. It results in longer transposition strings, which are more secure on one hand, but more demanding from a computational burden standpoint.

Advanced Plus 'Wild' Unary (Pair Wise) Encoding

Advanced wild unary encoding may be implemented with pairs of bits rather than with single bits. The same procedure is followed with some minor adjustments. $B_v$ is build from a mix of '00' pairs and '11' pairs. Each pair represents a count of 1 towards the representation of the integer value of each section. The choice whether to use 00 or to use 11 is either done deterministically or randomly as discussed ahead. The count of leading zeros is represented with a pair of '01', where each pair represents a count of one towards the value that counts the number of leading zeros in each subsection of B. The pair of '10' is left to be used for administrative purposes, like marking the start of end of an encoded message.

One could use the pairs of bit, replacing a single bit, without any further procedural adjustment. However, since the v-bits are represented by 00 or 11, and the r-bits by 01, it is possible to consolidate the two strings $B_v$ and $B_h$ into a single string, where by the identity of pair it would be clear where the respective substrings start and end. The number of ones and zeros will be similar and the security of using one consolidated string will be enhanced.

The advantage of pair wise encoding is the ability to either communicate a subliminal message through the choice of pair identity (00 or 11), or by using more unilateral randomness to select each time whether to use 00 or 11.

Illustration: Let's consider B=001100110100010. Parcelled out as follows: $b_1$=00110 $b_2$=01 $b_3$=101 $b_4$=00010. Accordingly we write:

| # | $r_i$ $v_i$ ... $b_r$ ... $b_v$ |
|---|---|
| 1 | 2 6 ... 010101 ... 00110011001100 |
| 2 | 1 1 ... 0101 ... 0011 |
| 3 | 0 5 ... 01 ... 001100110011 |
| 4 | 3 2 ... 01010101 ... 001100 |

So the unary encoding of B=001100110100010 is:
$B_u$=10  010101  00110011001100  0101  0011  01  001100110011 01010001 001100 10.

Security Analysis of Unary Encoding

Intuitively the larger the value of t, the greater the security, but the greater the computation burden and the longer the ciphertext. So a trade off is called for.

For a given t value the encoded payload message $P_u$ and its transposed version (the respective ciphertext), C, is comprised of m bits. The cryptanalyst will first try to identify what is the letter makeup of C, and then they will have to worry about how to order these letters to reconstruct C in plaintext mode ($P_u$). So the cryptanalyst faces the following equation:

$$m = a_1 * + a_2 * 2 + \ldots a_{2^t} * 2^t$$

where $a_i$ (i=1, 2, ... $2^t$) is the number of letters encoded as a substring of i zeros or i ones in the pre-transposed encoded string.

$a_1$ may have the values 1 to m. $a_2$ may have the values 1 to 0.5 (m−m MOD 2). In general, we can write:

$$1 \leq a_i \leq (m - m \text{ MOD } i)/i$$

Therefore the number of distinct tuples of $a_1, a_2, \ldots a_2^t$ is computed as:

$$\pi(m - m \text{ MOD } i)/i \ldots i=1,2, \ldots 2^t$$

which may be written as:

$$\eta_t = m^{2t-1}/(2^t)!$$

which shows how the security (which is proportional to $\eta_t$) rises quickly with t.

If the same TRC key is used for some q messages, then for message j, $m_j$, where j=1, 2, ... q one writes:

$$m_j = a_{1j} * 1 + a_{2j} * 2 + \ldots a_{2j}^t * 2^t$$

Looking for the TRC key that would resolve the $2^t * q$ unknowns, and further set the resultant letters in the right order.

This challenge is greater for a larger t—there are more unknowns to resolve. On the other hand the size factor is increased with the value of t. The bit size ratio between the ciphertext C, and plaintext $P_h$, is:

$$|C|/|P_h| = 2^{t-1}/t$$

Also the the key space and the TRC operation grow exponentially with the size of t.

Hybrid Text Encoding

A string of bits B may be expressed via an alphabet A of a=$2^t$ symbols where t is a positive integer. It can be done per symbol identity: $2^t$ symbols will represent all the possible t-bits long strings, and hence B will be represented as a string of letters from A. Common example is Base64 where t=6.

B though, can be expressed via a unary alphabet, U, comprised of two symbols (t=1) wherein B is also divided to sections, but which are s-bits long. s>t. Every s-bits string will be evaluated as to its numeric integer value, v, from v=0 to v=$2^s$−1. This value in the unary alphabet will be expressed by setting up a string comprised of v+1 zeros: 000 . . . 0. Bit of identity "1" will be used to signify the boundaries of a letter. In order to account for value zero, one will encode a value v of a string as a string of zeros containing (v+1) "zero" bits. So if B=000101000011, and s=6 then B=000101, 000011; with respective integer values: 5, 3. So B will be encoded to B*, written as B*=00000010000 in the unary alphabet. The advantage of the unary system is that s may be much larger than t which here is equal t=1. We call this alphabet the t=1 unary alphabet. Alternatively, the strings that represent s-bit strings by their bit count, could alternatively switch from "0" to "1" and thereby bound each other. So B that was written above as: B*=00000010000, will be written a bit more economically as B*=0000001111.

We now define a "t=2 unary alphabet". Defined over t=2, hence a=4 symbols. Two of those symbols will be used interchangeably when constructing the string such that its symbol count reflects a particular s bits long string in B. A third symbol will be used to mark boundaries between the symbol strings that represent s-bits strings. The 4th symbol is not absolutely necessary but since we have it we might use it for admin purposes, like marking the beginning and the end of a word, or separating between two bit strings B and B'.

Illustration: using the t=2 unary alphabet (or "t2-unary alphabet") over the example above and using letters X. Y interchangeably to count bits. Using W as a separator between letters, and using Z for admin purposes we write:
B*=ZXXXXXXWXXXXZ=ZYYYYYYWYYYYZ= ZXYXYXYWYXYXZ= . . . $2^{10}$=1024 distinct expressions t2-unary alphabet allows for a large set of distinct strings of symbols to all represent the same bit string B. This variety is useful for (i) cryptographic aims, and (ii) attaching a secondary message β to the primary message in B.

We define a synthesis between the symbol identity alphabet and the unary alphabet. It is referred to as a hybrid alphabet, H. We consider the case where 1<t<s. There will be an alphabet A comprised of a=$2^t$ letters which are not enough to express all the $2^s$ possible s-bit size string that B may be comprised of. We will say then that each letter, symbol, in A should represent u=$2^s$−$2^t$=$2^{s-t}$ letters—combinations of s-bits strings. This representation may be done in the unary way. Each letter in A will be written as a string of same letter with letter count between 1 and u.

Illustration: let s=6, and t=4. A then will be comprised of $2^4$=16 letters, which will have to represent $2^6$=64 distinct 6-bits strings. This evaluates to each letter in A to have to represent u=$2^{6-4}$=4 6-bits strings. This can be done by requiring that each of the 16 letters in A will be written as X, XX, XXX, or XXXX, or Y, YY, YYY, YYYY, Z, ZZ, ZZZ, ZZZZ, or W, WW, WWW, WWWW the way strings are represented in the unary system.

If t=1 then the hybrid alphabet collapses to the unary alphabet. If t=s it collapses to the symbol identity alphabet.

In order to make the hybrid alphabet viable we need to solve the issue of letter boundaries. This can be done in the following way. Instead of mapping u letters to some letter X written as a string comprised of 1 to u counts of X, we will shift the count to from 2 to u+1. This will free the singular appearance of X to serve as boundary for all other letters in the alphabet. So in the example above let the letter X of A represents four strings comprised of s bits each and marked s1, s2, s3, s4. But instead of writing S1=X, S2=XX, S3=XXX, and S4=XXXX, we write: S1=XX, S2=XXX, S3=XXXX, and S4=XXXXX.

The assignment of the $2^s$ strings to $2^t$ letters does not have to be equally parceled. So for t=3 and s=6, we have an alphabet of 8 symbols (let's call them X, Y, Z, W, U, V, R, Q). These 8 symbols will have to express $2^6$=64 distinct 6 bit strings. So on average every letter in A will have to represent 64/8=8 strings of size 6 bits each. We can use Base64 to define the 64 6-bits string and assign as follows:

| Base64 Hybrid Encoding |
| --- |
| 1 XX |
| 2 XXX |
| . . . |
| 8 XXXXXXXXX |
| 9 YY |
| 0 YYY |
| a YYYY |
| . . . |
| h YYYYYYYYY |
| i ZZ |
| j ZZZ |
| k ZZZZ |

And so on. So if B="hi290" then the hybrid encoding used to write the encoded version will look like:
Bh=YYYYYYYYYZZXXXYYZYYY The last Z in the string is there to separate the first two YY from the last three YYY. So that the Y letters are not interpreted as a YYYYY. Eventually the 8 letters of alphabet A are represented with 3 bits each, therefore B which is a string of 5 Base64 letters is expressed bit-wise as 5*6=30 bits. But $B_h$ is represented as 20 letters, each represented via 3 bits: 20*3=60 bits. Twice as large. By comparison an average Base64 string comprised of 5 letters will be encoded in 5*32=160 bits.

Balanced and Unbalanced Hybrid Text Encoding

When all strings of size s bits are expressed with alphabet A comprised of $2^t$ letters (t<s) and each letter in A represents $2^{s-t}$ s-bit size strings, then "hybridization" is regarded as balanced. It is possible to encode hybridization in an imbalanced way.

Example. Let s=6. Let t=5. Alphabet A has $2^5$=32 letters. Each letter in A will represent two strings of 6 bits each. 30 letters $L_i$ for i=1, 2, . . . 30 will represent each two 6-bits strings as $L_i$ and $L_iL_i$. While $L_j$ for j=31, 32, will represent two 6 bits strings as $L_jL_j$, and $L_jL_jL_j$, so that $L_{31}$ and $L_{32}$ in singular can be used to separate each of the other 31 letters to properly interpret a series of repetitive letters. This will be balanced hybridization.

Imbalanced option: For s=6, let 30 distinct sequences of 6 bits be represented by 30 letters in A—one 6-bits string each letter. The other 34 sequences of 6-bits strings will be represented alternatively by a series of $L_{31}$ and $L_{32}$. So that it will be possible to correctly interpret the $L_{31}$ and $L_{32}$ sequences: $L_{31}L_{31}L_{31}L_{32}L_{32}$.

Note: handling strings of size q bits where q≠MOD s, can be done in various agreed upon ways. For example—the ways an arbitrary bit string is expressed in Base64 (s=6).

Count Sharing (Letter Sharing)

Instead of assigning one letter in alphabet A to u strings of s bits long each, it is possible to share two or more. Let a letter from A, say X be assigned as XX, XXX, XXXX to some s-bits long strings. It is possible to count the number of letters to determine which s-bits string it represents by stating that the counting can be shared between the letters X and Y, so the above assignment can be written as YY, YYY, YYYY, or YX, XXY, YYXY, etc. . . . For counting purposes it does not matter whether the representation is done via X or via Y.

Such sharing allows for (i) delivering a secondary message through the particular choice of the letters in the sharing pool, and for cryptanalytic security: allowing the selection of which of the shared letters to use each time to be determined through randomness. And so the same message becomes a different ciphertext each time.

Illustration: we look at the case where s=5 and t=2 (X, Y, Z, W). There are 32 5 bits strings to be represented via the 4 letters of alphabet A. We write the four letters of A as $L_1$, $L_2$, $L_3$, $L_4$. We can assign these four letters to represent the 32 strings of 5 bits $s_1, s_2 \ldots s_{32}$ as follows:

$$(k+1)*L_i \rightarrow s_{s*(i-1)+k}$$

Where $(k+1)*L_i$ is a string of k+1 instances of $L_i$. And k=1, 2, . . . 8 Namely $L_1$ will represent $s_1 \ldots s_8$, $L_2$ will represent $s_9$-$s_{16}$, $L_3$ will represent $s_{17}$ to $s_{24}$, and $L_4$ will represent $s_{25}$ to $s_{32}$.

We now define $L_{ij}$ as a letter of A {X, Y, Z, or W} which is either $L_i$, or $L_j$ (i, j=1, 2, 3, 4, i≠j). We replace the above assignment where each of the four letter was interpreted to 8 strings 5 bits long each, (according to letter count) to an assignment where each pair of letters will be interpreted to 16 strings 5 bits long each:

$$(k+1)*L_{1,2} \rightarrow s_k \ldots k=1,2 \ldots 16$$

$$(k+1)*L_{3,4} \rightarrow s_{(16+k)} \ldots k=1,2, \ldots 16$$

$(k+1)*L_{1,2}$ is a string comprised of (k+1) $L_{1,2}$ letters. There are $2^{k+1}$ distinct strings of $L_{1,2}$ letters, each is interpreted to the same 5-bits long string.

Operation of Hybrid Text Encryption (Basic)

We describe the operation that is carried out between a transmitter and a recipient who communicate via ciphertext that is exposed to their adversary from whom the transmitter and/or the recipient wish to hide the content of their communication.

We describe (i) the elements of the operation, (ii) the dynamics of the operation, (iii) implementation attributes.

The Elements of the Operation

We recognizer a transmitter T, a recipient, R, the Communication and delivery agent, D, and an adversarial Eavesdropper, E.

We recognize the payload message M to be delivered from the transmitter to the recipient. M is assumed is written in some original form, and regarded as the original plaintext, $P_o$.

We recognize the plaintext written as a bit string, $P_b$, encoded from $P_h$.

We recognize the plaintext in hybrid-text encoded form $P_h$. Encoded from $P_b$.

We recognize the content of $P_h$ captured in the respective ciphertext $C_h$. This ciphertext is releaseable to adversarial inspection, considered as secure.

The transmitter and the recipients are assumed to share:
1. Hybrid-Text Definition (hybridization key, $K_h$)
2. Complete Transposition key, $K_t$.
3. Packing Procedure.
4. Public Data "Packing procedure" defines how to pack the payload, $P_h$, with meta data to identify it properly, Shared Information The transmitter and the recipients are assumed to share:
Hybrid-Text Definition (hybridization key, $K_h$)
Shared rules for decoding an arbitrary bit string into a hybrid format. $P_o \rightarrow P_b \rightarrow P_h$
Complete Transposition key, $K_t$)
All the data needed to effect a transposition in a way that every one of the factorial permutations is a likely output for every arbitrary input.

Packing Procedure.

The rules for fitting the protected (encrypted) message $P_h$ in a larger bit frame which includes meta data to properly administer and handle the message.

Public Data

Data available on the Internet and to the public at large. For example: a large number of hybrid texts definitions may be logged on a public website, so that the parties (the transmitter and the recipient) can refer to a particular encoding by a number or index, rather than pass on all the details.

The Transposition Key

The format of the transposition key depends on the transposition method used. The key to effect a complete transposition of a list comprised of n elements may accept n! values. Namely, the complete transposition key space is $|K|_t$=n!

Using the method defined in U.S. patent application Ser. No. 14/714,328 the transposition key is comprised of a secret integer, and "ghost" information which may, or may not be handled confidentially. The security of the method relies solely on the secrecy of the transposition integer.

Packing Procedure

The protected message in its encrypted form, $C_h$, is fitted into a framework comprised of meta data that is used to handle and administer the message. This meta data must conform to rules of procedure so that the recipient can properly interpret what the transmitter sends over.

The meta data may optionally identify the transmitter, the recipient, the circumstances, the locality, the date and time, the degree of security. It may reference various public data to be used by both parties. In particular the meta data can refer to a specific hybrid text procedure on the Internet, to pass to the recipient the information how to decode the hybrid text to the original text.

Operation Dynamics

The TEAM is a 9 steps process:
1. Digitization
2. Hybrid-Encoding
3. Complete Transposition
4. Packaging
5. Exposed Communication
6. Unpacking
7. Reverse Transposition
8. Hybrid-Decoding
9. Un-Digitization Steps 1-4 are carried out by the transmitter. Step 5 is carried out by the communication carrier. Steps 6-9 are carried out by the recipient.

The transmitter and the recipients are assumed to share:
1. Hybrid-Text Definition (hybridization key, $K_h$) 2. Complete Transposition key, $K_t$. 3. Packing Order.

Transmission Dynamics

Transmission is comprised of:
1. Digitization 2. Hybrid-Encoding 3. Complete Transposition 4. Packaging.

Digitization is the process where the original expression of the processed message M is transformed into a bit-string, $P_b$. $P_b$ may be moved around surrounded by a header and/or a trailer carrying various meta data about $P_b$, known as the "payload".

Hybrid Encoding

Hybrid encoding amounts to transforming the binary string version of the payload, $P_b$, into the binary string that reflects its hybrid encoding: $P_b \rightarrow P_h$.

As discussed above, the hybrid text may range from unary encoding to one on one symbol encoding (like Base64).

The hybrid text attributes are identified as the "hybridization" key, $K_h$, because it is of some advantage to not have them exposed. $K_h$ is all that is needed to transform the binary form of the payload, $P_b$ to the hybrid-text form $P_h$: $P_h = H(P_b, K_h)$. H is the hybridization function.

Clearly $|P_h| \geq |P_b|$

The hybridization key, $K_h$ works both ways. It allows one to create the hybrid text $P_h$ from the binary input $P_b$, and similarly allows one to reverse compute $P_b$ from $P_h$.

$K_h$ is comprised either of a table that lists on one hand all the $2^s$ strings of size s bits, and having those strings be matched with a single or sequence of some letter in the used alphabet A. $K_h$ also includes a binary interpretation of every letter in A in a binary format. The latter can be common knowledge, not part of the key. (e.g. Base64, ASCII table). The mapping of an s-bit strings to the letters in alphabet A may be done via a formula, which is easier to share in secret.

$K_t$ may contain letter sharing as discussed above. In that case the transformation $P_b \rightarrow P_h$ will involve either some source of randomness to randomly determine the structure of the letter sharing strings, or some ride-on message M* that is expressed via the particular letter selection in letter sharing situations. In the basic form herein we will only address a random selection of letter identity in letter sharing situations. This randomness source may be quantum grade or algorithmic:

$P_b$+unilateral randomness$\rightarrow P_h$

There is no need for a source of randomness for the reverse computation $P_h \rightarrow P_b$. The deployed randomness does not have to be pre-shared with the recipient. It is regarded as unilateral randomness.

Complete Transposition

The hybridized text, $P_h$ undergoes now the act of enciphering which is complete transposition. That means the n elements in $P_h$ are re-ordered with a transposition key, $K_t$, such that everyone of the factorial number of permutation—n!. The terms complete transposition refers to the fact that every one of the n! distinct permutations of the original n elements list is equally likely to be the resultant permutation. And vice versa, given a transposed order, every one of the n! permutations could equally serve as the pre-transposition permutation that was transposed to the given permutation.

The transposition is applied only to the payload, not to the meta data.

There are several options to interpret $P_h$ as n ordered elements. It can be done bit-wise, or it may be done over substrings of bits of size r. The r-size transposition may be cascaded. The choice depends on computational burden considerations.

The bit-wise transposition is straight forward. If the payload is comprised of n bits, then it may be transposed n! ways where many of these ways will be the same. At most there are $2^n$ different permutations. So on average $n!/2^n$ transpositions will coincide into the same permutation. For increased values of n the TRC may be too burdensome from a computational standpoint. To alleviate this burden one could opt to transposing r-bits strings r>1. This will reduce the transposition list from n to n/r, and the key would be coming down from n! to (n/r)!

Cascaded Transposition

For a bit string $B_h$ comprised of n bits let $n=2^q$ for q a positive integer. Let us divide $B_h$ to $r=2^g$ bits strings. $B_h$ will be comprised of $2^{q-g}$ strings that can be transposed in $(2^{q-g})!$ different ways.

One may apply TRC over strings comprised of r bits, where $r=2^g$. This will reorder $B_h$ to $B_r = TRC(B_h, g)$.

One can now apply TRC to $B_r$, using strings of size $r' = 2^{g+1}$ bits. There are $2^{q-g-1}$ strings of r' bits. There are $(2^{q-g-1})!$ permutations. Resulting in $B_r \rightarrow B^1_r$.

Next one would apply TRC to $B^1_r$, using strings of size $r'' = 2^{g+2}$ bits. There are $2^{q-g-2}$ strings of r'' bits. There are $(2^{q-g-2})!$ permutations. The result is $B^1_r \rightarrow B^2_r$.

Similarly this process will continue with $r(i) = 2^{g+i}$ bits strings of which there are $2^{q-g-i}$ strings of r(i) bits. There are $(2^{q-g-i})!$ permutations. The result is $B^i_r \rightarrow B^{i+1}_r$.

For i=1, 2, . . . (g−1) The total number of transpositions will be:

$\pi(2^{q-g-i})!$ . . . for i=1, 2, . . . (g−1)

These transpositions are progressively smaller in transposed-elements count, and hence faster. Their count too, is smaller than the bit-wise option:

$\pi(2^{q-g-i})! < (2^q)!$

The order for the cascaded transposition may be arbitrary, and also the it is possible to repeat a $2^g$ bits string transposition, after having applied a transposition at another level, $g' \neq g$.

Cascaded transposition may also apply over an n bits string where n is divided by d divisors:

$n = o$ MOD $D_i$ . . . for i=1, 2, . . . e and $D_i < D_{i+1}$. At level i the n-bits string will be transposing $n/D_i$ elements.

Maximum Variety Cascade

Let $P_h$ be a bit string comprised of $n = |P_h|$ bits. Let it be divided to t subsections such that no two subsections are identical. Various options for such division are presented in U.S. patent Ser. No. 10/594,480—Cyber Passport). We focus on such division where $0 = n$ MOD $t$ and all the subsections are of size $s = n/t$ bits. Such division will ensure that transposition of these t subsections may result in any of the t! permutations, each distinct from the other.

Such "t-grade" transposition may be completed by using the same or different key to transpose $B_h$ by combining any two of the t subsections to a single one, if t is even, and to 0.5t−1 sections, if t is odd (the last t section will be left alone, not subject to the secondary transposition). After this secondary transposition it is possible to repeat the process, and combine two consecutive elements as transposed, into a single element, and transpose $P_h$ again—with the lower resolution. And so on until $P_h$ is becoming one element.

Illustration: Let $P_h=100100110001010111110010100001110000$.
$n=|P_h|=36$. We try as a high a t value as we can t=18, and write:
$P_h$=10 01 00 11 00 001 01 111 00 10 100 01 11 00 00

This obvious does not work because we have many duplicate subsections. If we try t=12 (s=36/12=3):
$P_h$=100 100 110 001 010 111 110 010 100 001 110 000

Here too we have duplications: three "100", three "110" etc. If we try t=9 (s=36/9=4):
P=1001 0011 0001 0101 1111 0010 1000 0111 0000

Here all subsections are different, as desired. So if transposed in this resolution (t=9) there will be 9! permutations.

They are transposed as followed:
$C_{h1}$=0000 1001 1000 0011 0001 0010 0111 0101 1111

We now combine into 8 bits size subsections:
$C_{h1}$=00001001 10000011 00010010 01110101 1111

Since t=9 is odd, we have a 4 bit subsections left alone at the end of $C_{h1}$. But we do transpose the other bits:
$C_{h2}$=00010010 00001001 01110101 10000011 1111

We now continue and combine the 8 bits subsections to 16 bits subsection: $C_{h2}$=0001001000001001 0111010110000011 1111

Which we transpose:
$C_h=C_{h3}$=0111010110000011 0001001000001001 1111

And we thereby completed the cascaded transposition.

Transposition Key Management

Unlike with Vernam cipher TEAM ciphers may encrypt the payload plus the transposition key, $K_t$ to be used in the next round and thereby extend the security achieved in the first message encryption to all subsequent messages.

Packaging

The encoded message, $P_h$, is regarded as the payload. It is being encrypted to the respective ciphertext, $C_h$, which is considered the payload in ciphertext form. This payload may be wrapped by a header and a trailer—two bit strings that accompany, and describe the payload. The act of packaging is this 'wrapping'.

The header may be constructed as follows:
1. message start signal
2. sender id, time of transmission, open fields
3. encoding data
4. transposition key indicators
5. payload size
6. header end indicator.

Open fields are good practice, to allow for any subsequent need to be services. The encoding data identifies the exact scheme used to encode the input bit string. The parameters for the $P_b \rightarrow P_h$ process. So that the recipient will be able to decode $P_h$, which they will recover from the ciphertext $C_h$, back to the $P_b$. The transposition key indicators are used to signal to the recipient a particular choice among several secret transposition keys. The payload size in bits is needed for the recipient to be able to extract the payload from the package. The header-end indicator is needed for the recipient to identify where the header ends and the payload begins.

The trailer is constructed as follows:
1. trailer start indicator
2. Transmission history
3. signature (payload hash/header hash)
4. end of trailer indicator The trailer start indicator, tells the recipient that the payload has concluded and the trailer begins. This should fit with the payload size indicator on the header. The transmission history will allow each subsequent recipient of the message to mark the fact that it was received by them. This is effective when a given message is routed through several recipients. Both the payload and the header may be hash-signed against errors, or hash-signed against abuse (and the hash is then signed with the transmitter secret hash key). The end of trailer indicator identifies the end of the package.

In practice some of these fields may be missing. When the ciphertext payload is properly 'packed' with the header and the trailer it is considered 'packed' and ready for release into adversarial territory.

Communication and Delivery

The communication and delivery agent accepts the ciphertext $C_h$ and feeds it into a communication network with the recipient as the intended target. This communication is considered exposed to an adversarial eavesdropper. At its discretion the delivery agent may apply additional cryptographic protection, which will be removed before passing the delivered ciphertext, $C_h$ to the recipient.

Recipient Dynamics

The recipient steps:
5. Reverse Transposition
6. Hybrid-Decoding
7. Un-Digitization The recipient, receiving the transposed message (the ciphertext), $C_h$, will use it as input into the decryption procedure, which is the reverse-transpose operation. The recipient uses the secret transposition key that the transmitter used to encrypt the plaintext. The result of this operation is the hybrid-text version of the message: $C_h \rightarrow P_h$.

The hybrid text is decoded to the original form using pre agreed upon hybridization procedure, or relying on hybridization instructions supplied in the meta data that accompanied the message, or also relying on public databases which identify and specify any number of hybridization routines, which the meta data points to one of them that was used in this transmission.

Un-Digitization is optional, if the original message is analog or other than a bit string.

Encryption and decryption is carried out over the payload only, not over the meta data.

Illustration

Let a message M be expressed as a bit string $P_b$=011 001 100 010 111 010 011 101 (the spaces are for readability only). Size: 24 bits: $|P_b|$=24. A transmitter wishes to use the basic unary way to re-encode $P_b$ in a unary fashion: $P_b \rightarrow P_u$ by splitting $P_b$ to subsections comprised of 3 bits each. To that end the transmitter will read $P_b$ 3 bits at a time and record the integer represented by each 3 bits section:

$P_b$=3, 1, 4, 2, 7, 2, 3, 5

And then express these values in the unary way, building $P_u$: setting up 3+1 "zeroes", 1+1 "ones" followed by 4+1 "zeroes", etc.:

$P_u$=0000 11 00000 111 00000000 111 0000 111111

The spaces are for readability only. $P_u$ is now ready to be encrypted by transposition. We use U.S. patent application Ser. No. 14/714,328 Equivoe-T with no "ghosts" where the transposition "remover" key, $K_t$=7, resulting in:

$C_u$=0100 001 110 1001 0001 0001 1010 0001 010

The transmitter will then pack $C_h$ with header containing meta data including a designation of $C_u$ as comprised of 35 bits:

The package will be routed to the recipient who will reverse-transpose $C_u$ to $P_u$, and then decode $P_u \rightarrow P_b$.

The transmitter could have decided to use substrings of size s=5 (and pad with zeros as necessary):
&$P_b$=00001 10000 01110 00000 00111 00001 11111
Accordingly:
$P_b$=1, 16, 14, 0, 7, 1, 31
And decode binary to as (1+1) zeroes, followed by (16+1) "ones", followed by (14+1) "zeroes" etc.:
$P_u$=00 1111111111111111 0000000000000000 1 00000000 11 000000000000000000000000000000000

Now the encoded plaintext, $P_u$ is much longer. Transposing it with the same key, one gets:
$C_u$=11001000000110000000110000001100000110100100 000000010000000010000000111110000

Hybrid Encoding

One may choose to interpret $P_b$ as a sequence of s=4 bits substrings:
$P_b$=0110 0110 0010 110 1001 1101

And choose to encode them with a t=3, $2^t$ size alphabet: 8 letters, designated as: X, Y, Z, W, U, V, S, R. Mapped as follows: X=000, Y=001, Z=010, W=100, U=011, V=110, S=101, R=111

The 4-bits substrings can be written $2^4$=16 different ways, so they can be expressed Hex notation.
$P_b$=6 6 2 e 9d We define the hybrid encoding as:
X-1, Y-2, Z-3, W-4, U-5, V-6
SS-7, SSS-8, SSSS-9, SSSSS-a, SSSSSS-b, SSSSSSS-c, SSSSSSSS-d, SSSSSSSSS-e, SSSSSSSSSS-f, 0-SSSSSSSSSS Leaving R to serve as a separator. And hence:
$P_h$=V V Y SSSSSSSSS R SSSS R SSSSSSSS=110 110 001 101 101 101 101 101 101 101 101 101 111 101 101 101 10 1111101101 101 101 101 101 101 101

Transposed with a shared key: $K_t$=11:
$C_h$=0110110100000111110111010111111101111011111 11110111010/100111010100101101

The recipient is working his way back $C_h \rightarrow P_h \rightarrow P_b$.

Alternatively, the transmitter may choose hybridization procedure as follows: XX-0, XXX-1, YY-2, YYY-3, ZZ-4, ZZZ-5, WW-6, WWW-7, UU-8, UUU-9, VV-a, VVV-b, SS-c, SSS-d, RR-e, FFF-f And hence $P_b$—$P_h$:
$P_b$=6 6 2 e 9 d$\rightarrow$P=WW WW YY RR UUU SSS$\rightarrow$WWXWWYY RRUUUSSS Adding 'X between the two WW strings to indicate a double letter WW='6'.

The hybrid alphabet is then mapped into its bit representation:
$P_h$=100 100 000 100 100 001 001 111 011 011 011 101 101 101 which we will encrypt (transpose) using the same transposition key $K_t$=143577
$P_h \rightarrow C_h$=11000000110101111110110000100101001011111 0110

Alternatively the transmitter may choose to use cascaded transposition in the following way. The are 15 letters in $P_h$=WWXWWYYRRUUUSSS. Each letter represents a string of 3 bits (54 bits in total). Instead of transposing $P_h$ bit-wise it is possible to first transpose $P_h$ letter-wise (3 bits strings at a time).

The transmitter can choose the very same transposition key $K_t$=143577 and transpose $C_h$ to:
Ph$\rightarrow$$C^1_h$=UWRWUYXYWSSWSRU $C^1_h$ can be transposed 3 letter at a time:
$C_h$=UWR WUY XYW SSW SRU Transposing, say, with different key $K_t$=574:
$C_h \rightarrow C^2_h$=SSW UWR WUY SRU XYW And then, transpose the result 5 bits at a time:
$C^2_h$=SSWUW RWUYS RUXYW, with the same $K_t$=574:
$C^2_h \rightarrow C_h$=SSWUW RUXYW RWUYS
which in bit expression looks like this:
$C_h$=SSWUW RUXYW RWUYS=101 101 100 011 100 111 011 000 001 100 111 100 011 001 101

The recipient will run the cascade backwards:
$C_h \rightarrow C^2_h \rightarrow C^1_h \rightarrow P_h \rightarrow P_b$ Implementation Attributes The operation and procedures described above may be implemented through (i) software-only, (ii) software plus non-algorithmic randomness, (iii) software plus application specific integrated circuitry (ASIC), and (iv) ASIC. only.

Heavy duty use will require non-algorithmic randomness. ASIC modules will greatly boost the cipher by allowing for transposition of much larger lists.

Non Algorithmic Randomness

The "Rock of Randomness" technology (U.S. Pat. No. 10,467,522) may be used a source of randomness, both for shared randomness (key material) and for unilateral randomness, as required by the TEAM protocol. There may be two rocks, both may be fitted on a latch-on device that is connected to the computing machine for use. The latch-on device may also be biometrically secured.

Application Specific Integrated Circuitry

The entire procedure may be hardware implemented, or alternatively focus primarily on hardware implementation of the transposition operation, in order to allow for efficient transposition of large lists of items.

Transposition Specific Integrated Circuits (TSIC)

We identify two categories of TSIC: (i) implementation of the technology described in the continued application Ser. No. 14/714,328, Equivoe-T, (ii) fixed-size transposition. The advantage of the Ser. No. 14/714,328 technology is that one transposition key applies to any size transposed list. Other methods normally require a preset list size to be transposed.

The TSIC may be built into a latchable device, which may be secured through an activation code, or biometric. The device will have means to enter the transposition key, $K_t$, as well as an input port for the pre-transposition input and an output port for the post-transposition output. The device can be fitted with a USB port into a computer handling the cryptographic tasks.

Equivoe-T

This solution may come in two flavors: (i) calculated remainder, (ii) rotation count.

In the calculated remainder method, the 'removal key', $K_t$, will be arithmetically processed in the underlying computing machine to extract the 'step count', s=$K_t$ MOD L, where L is the size of the list. once the step count, s, is computed, the TSIC circuitry will count s steps in the prescribed directions in order to find the next item to remove to the built-up permutation.

In the "rotation count" mode, the process will count K, items on the list such that when the counting comes to the end of the list it will return to the beginning and continue counting. This will continue until the counting is complete, and it identifies an item on the list, to be the one removed next from the original list to the built-up list. In the pre-calculated mode the counting rounds will be replaced with counting s items on the list.

After removing the item on the 'shrinking list' to the 'growing list' the shrinking list will be condensed by either shifting all the item left of the removed item one location to the right, or by shifting all the items right of the removed item, one location to the left.

Alternatively the bits will be represented as "+1" v. "−1", with "0" indicating an empty location. Thereby the 'shrinking list' will start with n item, each of which is either "+1" (representing bit 1), or "−1" (representing bit 0), and the growing list will be all marked with n "0" (empty). As the Equivoe-T rotation count identifies the items in the shrinking list to be removed towards the 'growing list', then every removed item from the shrinking list is replaced by a "0", while the next in line "0" in the growing list is replaced by either "+1" or "−1" as the case may be, until the shrinking list becomes a lsit of n "0"s and there are no more zeroes in the growing list.

Ghost Handling

In order to accommodate the 'ghost' feature identified in application Ser. No. 14/714,328, one may choose to represent bit zero as the pair "01" and represent the bit one as the pair "10", then use "00" to represent an empty slot, as above, and use the pair "11" to represent a ghost.

Note: high count transposition is deemed a useful cryptographic tool for a variety of applications. A well constructed TSIC will serve this variety.

Non-Explicit Transposition Key

When the number of transposed elements, n, grows larger then the key space for the transposition increases very fast—factorially. This may require a very large key, which may be inconvenient to carry. Such inconvenience may be relieved as follows.

Let f be a function that computes an Equivoe-T transposition key (the remover), $K_t$ from two smaller values, a and b: $K_t=f(a, b)$. At any given round, when the shrinking list is of size n'<n bits, there is a need to compute the remainder r: r=$K_t$ MOD n'. The value of r can be computed directly from f, without specifying the value of $K_t$.

One simple way to do it, is to write a, b, and n' through their breakdown to primes. We write: $n'=n_1*n_2 \ldots n_n$, $a=a_1*a_2 \ldots *a_a$, $b=b_1*b_2 \ldots *b_b$. We set f as follows: $K_t=a^2*b^3$.

When now dividing $K_t/n'$ there are frequently many shared primes, which will be cancelled, making the division easier and extracting the remainder r without ever explicitly writing down $K_t$.

Fixed Size Transposition

The advantage of fixed size transposition in hardware implementation is that it allows for hard-wiring of the transposition operation to allow any permutation of n-items list to any other permutation of the same list. The issue here is that this transposition is fixed, and applies to a fixed size list.

It can be implemented over a fixed size input and output, say n item, where some t fixed transposition wiring units are listed in order: $T_1, T_2 \ldots T_t$. These t transposition rounds are combined into a single device. The input to the combined device includes a designation of which u transposition conversation units (among the available t transposition operations) to be applied over the input to generate the respective output. This list of u items is the 'secondary transposition key', $K^*_t$.

Every processing round in the device may involve a randomized selection of the next $K^*_t$ key, to be used in the next processing round in the device (the next application of the TSIC).

There are $2^t$ combinations to select active units among the available t, so the key space for the secondary key is: $|K^*_t|=2^t$.

The transposition can be hard wired to operate on individual bits or on sub-strings of bits of equal size.

The device input string $S_0$ will enter the first hard wired transposition unit, $T_1$, and come out transposed, $S_1$. This output string, $S_1$, will then encounter a decision node. If $T_2$ is listed in $K^*_t$ as a unit to be activated then $S_1$ will be fed into $T_2$ for another round of transposition. If $T_2$ is not listed in $K^*_t$ then $S_1$ will be routed to a similar decision node leading to $T_3$. Every transposition unit will be preceded by a routing decision junction based on the value of $K^*_t$.

The device will be built to allow for reverse transposition by simply reversing the input/output ports, using the same $K_t$.

Since this device operates on a fixed size transposition list, it will be of an advantage to build a multi-device featuring a $n_1$ bits transposition, next to an $n_2 > n_1$ bits transposition, next to an $n_3$ transposition device, and so forth. This multi transposition device will allow its user to choose the right size. Given an arbitrary input string of bits, B, the transmitter will apply various considerations to choose to parcel B to sections of the right size among $n_1$, $n_2$, ... etc. For example $n_1$=100 bits, $n_2$=1000, $n_3$=10,000 bits . . . .

Large Keys Handling

Transposition keys are rather large in general. A list of n elements will require a transposition key space of size |K|=n! This key space may be handled through input data to key computing procedure.

Illustration: Let a and b be two positive integers. One would compute integer c as follows: $c=\{a^b\}=a^b-(a-1)^{b-1}-(a-2)^{b-2}- \ldots (a-i)^{b-i}$ for i=1, 2, ... MIN(a,b) for as long as c>{pre-agreed minimum}.

Illustration:

$$\{3^4\}=3^4-2^3-1^2-0^1=71$$

$$\{4^3\}=4^3-3^2-2^1-1^0=52$$

While this "long exponentiation" (LE) does not cover all the integers, it can cover an infinite amount of them to handle any transposition requirement. Also, reverse computation is intractable: $\{a^b\} \rightarrow a$, b (intractable)

This can be used by the communicating parties. They can signal in the open that for the next message the value of a is increment by 1, or the value of b is multiplied, etc. A cryptanalyst, even if somehow acquired the transposition key, $K_t$, used in a previous message, will not have the transposition key used in the message where the values of a and/or b has been changed.

Of course, any variation thereto can be selected, like:

$$c=\{a^b\}=a^b-(a+1)^{b-1}-(a+2)^{b-2}- \ldots (a+i)^{b-1}$$

for i=1, 2, ... b for as long as c>{pre-agreed minimum}.

Equivoe-T Large Key Handling

There are two distinct ways to handle large transposition keys for Equivoe-T: (i) direct counting, (ii) modular divide.

In direct counting the key, 'the removal integer' is used to count through the 'shrinking list' until the count is exhausted and terminates on a particular item in the shrinking list. If the list has n elements, and the removal key, is an integer K, then the counting will start over n, and after removal of the first element, will the counting continue over (n−1), etc. We can write: K=ln+r, where l is a non negative integer and r<n. The number of rounds will start with l to begin with, then will grow for the next removal and so on, until the shrinking list will be comprised of only two elements and the removal key will recycle K/2 time.

Since l may be a very large number, this implementation in software is very inefficient. But even for a hardware construction, this direct counting may be too cumbersome.

Modular divide calls for computing $r_0$=K MOD n, then counting $r_0$ elements in the shrinking list to find the element to be removed. Next computing: $r_1$=K MOD (n−1), then counting $r_1$ elements in the shrinking list, starting with the element next to the removed element. To remove the (i+1) element one would compute $r_1$=K MOD (n−i), and repeat as above.

The modular division can be done by software or hardware.

Reiteration

The TEAM methodology can readily be iterated, using the same or different transposition keys each round. Such iterations will increase the equivocation and the security, and will come handy especially for short highly sensitive secrets. The operation is straight forward the ciphertext from one round will be regarded as an input string for the next round. The size factor will be a multiplication of the size factors for each round.

We consider $P_i$, as an arbitrary input string of bits which is to be regarded as input for a TEAM round associated with a transposition key $K_t^i$, generating a ciphertext $C_i$.

We now equate: $C_i = P_{i+1}$.

$P_{i+1}$ is now taken as an input into another TEAM round using a transposition key $K_{ti+1}$, generating ciphertext $C_{i+1}$.

This iteration may be applied from i=0, the original plaintext for any number of rounds: i=0,1, 2 ... r. The output of this iteration will be $C_r$, which will be regarded the overall output of this r-round application of the MEAD cipher. The size factor:

$$|C_r|/|P_0| = \pi \eta_i, \ldots \text{ for } i=1,2,\ldots r$$

Illustration, let $P_0$ be a secret pair of two Base64 character: $P_0$=001101 010011. A transmitter will parcel $P_0$ to 4 substrings as follows: 001-101-0100-11. The transmitter then encodes $P_0$ by writing $v_1$+1 bit of identity "1" followed by $r_1$+1 bits of identity "0", for i=1. Since $v_1$=1 and $r_1$=2, this results in $P_{u1}$=11000. This string will then be added to with the strings of "1" and "0" that represent the second substring of $P_0$ (i=2). Hence: $v_2$=5, $r_2$=0, so one adds 11111100 and now we have:

$P_{u1}$=11000 11111100

The same is continued for the third substring (i=3): $v_3$=4, $r_3$=1, the added string is: 1111100. When added to $P_0$ we get: $P_{u1}$=11000 11111100 1111100

The 4th substring is read as $v_4$=3, $r_4$=0, so the added string becomes: 111100, now added to complete the encoding: $P_{u1}$=11000 11111100 1111100 111100

We have a size factor=$|P_{u1}|/|P_0|$=26/12=2.17

Next $P_{u1}$ is transposed to $C_1$. Using removal key $K_t$=21 we get:

$C_1$=11011111100110101010011011

We now set $C_1$=$P_2$=11011111100110101010011011.

$P_2$ may be parceled out to two subsection: $b_1$=110111111 $b_2$=00110101010011011. Accordingly: $v_1$=447 $r_1$=0, and $v_2$=27291, $r_2$=2

The encoded plaintext will then be:

$P_{u2}$=[448 bits of identity "1"][1 bit of identity "0"][27292 bits of identity "1"][3 bits of identity "0"]

And hence $|P_{u2}|$=448+1+27292+3=27744 And $\eta_2$=$|Pu_2|/|P_{u1}|$=27744/26=1067.

The combined scale factor of these two iterations of TEAM is:

$$\eta_{1+2} = \eta_1 * \eta_2 = 2.17 * 1067 = 2315$$

This large scaling creates insurmountable equivocation, and a complete cryptanalytic defense.

Security Analysis

TEAM is designed with reliance on the security of the effective transposition key. All other information may be considered exposed. While it will be helpful to keep the encoding scheme (unary or hybrid) confidential, it is not a requirement of the cipher.

The transposition key may be constructed as a master transposition key, which then the parties carve out portions or modification thereto, exposing these modifications, relying solely on the confidentiality of the master transposition key.

In general operation the transposition key space is extremely large, and therefore effective for its purpose.

Built into TEAM is the notion of 'expansion at will'. The η values that captures the size increase of the encoded message versus the pre-encoded message may be set as high as desired, especially considering iterations. The higher the η value, the greater the security. So if a shared key is used beyond its design volume, its users can still maintain their desired security level if they agree to pay for it through more computational efforts and larger ciphertexts—this can be extended indefinitely. This expansion measure is especially practical for short small highly secure secrets to be transferred.

Summary of TEAM Operation

We summarize the Transposition Encryption Alphabet Method (TEAM) operation as follows:

Unary Encryption Overview:

TEAM is a method involving a transmitter and a recipient sharing a secret transposition key wherein the transmitter will pass to the recipient an arbitrary bit string $B_b$ in a form of a ciphertext $C_u$, computed from $B_b$ as follows:

The transmitter will take the following actions: (i) splitting $B_b$ to n arbitrary consecutive substrings $b_1, b_2, \ldots b_n$, with corresponding integer values $v_1, v_2, \ldots v_n$, and where $r_1, r_2, \ldots r_n$ represent the count of leading zeros in $b_1, b_2, \ldots b_n$ respectively, then (ii) building an encoded version of $B_b$, designated as $B_u$, by writing $v_1$+1 bits of identity "0", followed by $r_1$+1 bits of identity "1", followed by $v_2$+1 bits of identity "0", followed by $r_2$+1 bits of identity "1", and so on, for i=1, 2, ... n, adding $v_i$+1 bits of identity "0" followed by $r_i$+1 bits of identity "1", then (iii) transposing $B_u$ into $C_u$ using the shared secret transposition key, $K_t$: $C_u$=Transposition($B_u$, $K_t$), then (iv) passing $C_u$ to the recipient, the recipient then (v) performs a reverse-transposition $C_u$ to $B_u$ using the shared transposition key $K_t$, then ($v_i$) decodes $B_u$ to $B_b$ by re-constructing each substring $b_i$ for i=1, 2, ... n by counting the number of "0" bits in the i-th substring comprised of bits of identity "0" in $B_u$, which is $v_u$+1, then writing $v_i$ in binary arithmetic, then concatenating left to it $r_i$ leading zeros, where $r_i$ is given by the number of bits in the i-th substring of bits of value "1" in $B_u$ which is $r_i$+1.

The overview description above may be qualified as a a method wherein the transmitter constructs two strings, $B_v$ and $B_r$, wherein $B_v$ is constructed by listing $v_1$+1 bits of identity "0", followed by $v_2$ bits if identity "1", followed by substrings of $v_i$+1 bits, for i=3,4, ... n, where for an even i the bits are of identity "1" and for an odd i the bits are of identity "0", and wherein $B_r$ is constructed by listing $r_1$+1 bits of identity "0", followed by $r_2$ bits if identity "1", followed by substrings of $r_i$+1 bits, for i=3,4, ... n, where for an even i the bits are of identity "1" and for an odd i the bits are of identity "0", then $B_v$ is transposed to $C_v$ using the shared transposition key, $K_t$, and $B_r$ is transposed to $C_r$ using the shared transposition key, $K_t$, and $C_v$ then $C_r$ are communicated to the recipient, the recipient then reverse-transposes $C_v$ and $C_r$ to $B_v$ and $B_r$ respectively, extracts from $B_c$ the values $v_1, v_2, \ldots v_n$, and extracts from $B_r$ the values $r_1, r_2, \ldots, r_n$, and reconstructs $B_b$ from this values as in the overview.

Hybrid Encryption Overview:

a method involving a transmitter and recipient sharing a transposition key and an alphabet A, comprised of $2^t$ letters: $L_1, L_2, \ldots L_{2^t}$, where t is a positive integer, and wherein the transmitter and the recipient agree on how to encode an arbitrary bit string $B_b$ using A and converting $B_b$ to $B_h$, written with the letters in A, and wherein the transmitter will pass to the recipient $B_h$ in a form of a ciphertext $C_u$, computed from $B_b$ as follows:

The transmitter will first encode $B_b$ to $B_h$ as follows:

The transmitter will first divide $B_b$ to n substrings $b_1, b_2, \ldots b_n$ such that all the n substrings list q bits: $|b_i|=q$ for i=1, 2, ... n, where q>t such that at least two letters in A, $L_i$, and $L_j$, where A is comprising $2^t$ letters identified as $L_l$, l=1, 2, 3, $2^t$ are assigned to represent two or more of the possible $2^q$ distinct strings in $B_b$ by setting one such q-bits size substring as concatenation of two $L_i$: $L_iL_i$, and a second such q-bits size substring as a concatenation of three $L_i$ letters: $L_iL_iL_i$, and the k-th such substring as a string of (k+1) consecutive $L_i$, and where two consecutive substrings comprised of letters $L_i$ will be separated by interjecting letter L where j≠i between them, and by setting other such q-bits size substring as concatenation of two $L_j$: $L_jL_j$, and a another such q-bits size substring as a concatenation of three $L_j$ letters: $L_jL_jL_j$, and the k'-th such substring as a string of (k'+1) consecutive L, and where two consecutive substrings comprised of letters $L_j$ will be separated by interjecting letter $L_i$ where j≠i between them, and where based on this assignment $B_b$ will be represented by a string of letters in alphabet A, which is regarded as the hybrid encoding of $B_b$, namely $B_h$, which will then be transposed using the shared transposition key $K_t$ to $C_h$=Transposition($B_h$, $K_t$), then $C_h$ will be communicated to the recipient; the recipient in turn will apply the shared transposition key $K_t$ to reverse-transpose $C_h$ to $B_h$: $B_h$=Reverse-transpose($C_h$, $K_t$) and then reverse decode $B_h$ to $B_b$, using the shared method for encoding $B_b$ to $B_h$.

Device Overview:

TEAM is embodied as a device designed to execute transposition of an arbitrary size bit string, which is smaller than a preset size limit, where the transposition is determined by a transposition key which may be preset in the device or is being input into the device electronically, as often as a transposition operation is required, and where the input string (pre-transposed string), and the output string (transposed string) are communicated in and out via a standard port on the device so that it can be fitted to standard computing machines, and where the device contains Transposition-Specific Integrated Circuit.

The device above admits the following modification: the input string comprised of n bits where n≤h, where h is the high limit for acceptable input string, is fitted into an input register containing n bits, and then the transposition key determines an order by which the bits fitted into the input register are moved to another register, regarded as the "output register" where the bits accumulate one by one until the input register is empty and the n bits of the input string are placed in some permutation in the output register, and where subsequently the output register is copied form the output string, egressing the device.

The device above also admits the following modification: the input string comprised of n substrings of s bits each, where ns≤h, where h is the high limit for acceptable bit count in the input string, is fitted into the input register containing ns bits, and then the transposition key determines an order by which the n groups of s bits each, fitted into the input register are moved to the output register where the s-bits size groups accumulate one by one until the input register is empty and the n groups of s-bits each, of the input register are placed in some permutation in the output register, and where subsequently the output register is copied to the output string, egressing the device.

Fixed Size Transposition Device: this is the case where the input string is of a fixed size of n bits, and the device contain t units of integrated circuitry where each such unit is hard-wired to carry out a specific transposition of n bits from an input permutation to an output permutation, and where these t units are connected in a set order, in a way where the output of any unit except the last unit is either routed to become the input string for the next unit, or is routed to bypass the next unit towards the one next to it, and where the determination of whether to route through the next unit or to bypass it, is determined by a transposition key, $K^*_t$, that is input into the device as often as every transposition operation or less.

The fixed-size transposition also operates in 'reverse mode' where the input and the output are reversed, and where for every transposition unit in the device the output becomes the input and the input becomes the output, so that for any string B of n bits that is processed by the device described in claim 7, with transposition key $K^*_t$, and that generates an output string B', which then is served as input to the reverse mode of the device to generate string B'', using the same transposition key, $K^*_t$, it holds that B and B'' are identical: B=B''.

Applications

Hybrid text encryption is a general encryption solution, applicable to all digital encryption regardless of use case. However, the TEAM is especially suitable to passing along small amounts of highly secure data. That is because the ciphertext may be much larger than the plaintext.

Choice Ciphers

Ciphers offering their users to buy as much security as they wish, paying for it with computational burden Mainstay ciphers offer fired (unknown) security for a fixed computational effort: over-securing marginal data, under-securing important data.

A choice cipher allows its users to use it with a choice amount of computing effort, to achieve a desired level of security—up to mathematical perfection. The security associated with any individual piece of communicated data is best appraised by the transmitter of that data. Or by the transmitter and recipient combined. A Choice Cipher offers the possibility to pay with as much computational effort as necessary to achieve the exact desired security.

In a Choice cipher security is being achieved first through equivocation, and second through intractability. Both aspects can be credibly appraised by the user, and both can be adjusted by adjusting computational effort. Choice ciphers are based on two classes of randomness: bilateral and unilateral. Bilateral randomness is pre shared between the communication partners. Unilateral randomness is used unilaterally by the transmitter. It may result in a ciphertext much larger than the plaintext, which on its own presents a computational burden. The amount of unilateral randomness will determine the projected security of the communication, and it is up to the user to determine it.

Wild Unary Encryption as Choice Ciphers

Basic wild unary encryption has a limitation for parceling up a plaintext input string B to substrings that must all begin with 1. But in 'advanced wild' this limitation is eliminated.

Hence any given input bit-string B, can be chopped off to any desired number of substrings, each of which is of any desired size (desired bit count). The transmitter decides unilaterally on this chop-up strategy without any pre-agreement with the recipient. This strategy may be deterministic, and perhaps repeatable, or it may be randomized and non repeatable. The strategy may also be hybrid, illustration:

Given a string B comprised of q bits. One could set a low limit, L for size of a substring, and a high limit H for the size of the substring, and then use a randomness source to peak the bit size of the first subsection of B ($b_1$), $|b_1|$ in that range L-H: $L \le |b_1| \le H$. This will leave $q-|b_1|$ bits in B. Again a randomness source will be applied to select another value in the range L-H: $L \le |b_2| \le H$. This iterative process will continue until the number of bits left to be assigned as a subsection is smaller than L. In that case all the remaining bits will be assigned as $b_n$.

This guided randomness strategy will determine the average size of the unary encoded message (0.5(H-L)). It will also insure that repeat encryption of the same plaintext will result in different ciphertexts each time.

Let $\eta = |B_u|/|B_b|$ the size enlargement factor of the unary text to the input text. We can write: $2 \le \eta \le (2^q+1)/q$
which is also the size equivocation faced by a cryptanalyst.

In the 'maximum' case B will be a string of q bits of "1", and B is comprised of itself as a 'subsection' so the integer value will be $2^q$, the size of $B_v$: $|B_v| = 2^q+1$; while there are no leading zeros, so $|B_r| = q$.

In the "minimum" case, B will be a string q bits of "0" identity. B may be divided bit-wise, to q subsections. $Sp|B_v| = q$ The expect value for 11 in the above described strategy is:

$$\eta = 2^{0.25(H-L)+1}/0.5(H-L)$$

Because the average section size $b_i = 0.5(H-L)$, and on average the right half of average section defines its value $v_i$ and the left half is the count of leading zeros.

The user determines the value of l. The larger the value of I, the greater the security (because the greater the equivocation), but also the greater the consumption of unilateral randomness, and the greater the burden of its processing both for encryption and decryption. The user, then decides how much to invest to buy which level of security.

A deterministic parcel up of B may be made according to data sensitivity. We have seen that the range of $\eta$ is very large. A transmitter may use a small value of $\eta$ for the majority of the communicated message, and mark for high $\eta$ values the sections that are extra sensitive.

Pair Wise Unary Encryption as Choice Ciphers

The pair-wise wild unary encryption adds another element of randomness on top of the randomness used in normal wild encryption. It is the choice of the identity of the pair. For any specific selection of subsections of a bit string B, there are θ distinct unary encodings, where:

$$\theta = (2^{0.5(H-L)})^{q/0.5(H-L)}$$

And therefore the respective ciphertext, C has that many (θ) options for generating plaintexts—an overwhelming equivocation facing the cryptanalyst.

Recycled Unary Encryption

The unary ciphertext C can be regarded as an input string B' to a new round of encoding, resulting in a subsequent ciphertext C', which can be regarded as an input plaintext B" to yet another round of ciphertexts, C", and so on, an ever larger size ciphertext with ever larger amount of equivocation.

Choice Strategy

Users of choice ciphers pre-exchange a key reservoir, K, and monitor the extent of its use. let σ be some well defined measure of security associated with a communicated message adversarially exposed. Let U represent the 'use measure' of the shared key reservoir. Namely, how much plaintext/ciphertext was processed with K.

Up to use measure $U_0$, there is 'zero vulnerability'—perfect (Shannon) security. Beyond $U_0$, vulnerability creeps up—unless the transmitter proportionally increases the amount of unilateral randomness they deploy. The more randomness, the more processing burden both for the encryption and the decryption. Also the higher the value of η—a larger ciphertext size. The extra burden to maintain a target level of security σ, is rising exponentially but it has no hard limit. So, in principle, a sufficiently small next message may be communicated at any desired target security a given that the parties are prepared to put forth the rising effort to process encryption/decryption and communicate an ever larger ciphertext.

This is important for master keys and other critical information, which are small in bit size so that even if the ciphertext is several orders of magnitude larger—they can be transmitted with at will level of security (up to perfect (Shannon) security).

IoT Friendly

TEAM operation is based solely almost on one simple cryptographic primitive: transposition. From a computational view this is about the simplets operation possible with Turing machines. Transposition lends itself to very efficient hardware implementation, which further reduces the power consumption involved in the operation. A host of battery operated IoT devices will take advantage of this feature.

Post Quantum Use

TEAM cryptography is quantum resistant since its prime basis of security is equivocation—the ciphertext does not point to its generating plaintexts, except as a member of a large as desired number of plaintext candidates, among which a quantum computer cannot distinguish. The user buys security via more computation and longer ciphertext. The level of deployed security will match the perceived threat.

What is claimed is:

1. A method involving a transmitter and a recipient sharing a secret transposition key, $K_t$, wherein the transmitter transmits to the recipient a bit string $B_b$ of arbitrary size and arbitrary content in a form of a ciphertext $C_u$, computed from $B_b$, comprising:

Performing, by the transmitter: (i) splitting $B_b$ to n consecutive substrings $b_1, b_2, \ldots b_n$, each string of arbitrary size, with corresponding integer values $v_1, v_2, \ldots v_n$, and where $r_1, r_2, \ldots r_n$ represent the count of leading zeros in $b_1, b_2, \ldots b_n$ respectively, where n is a positive integer;

then (ii) building an encoded version of $B_b$, designated as $B_u$, by writing $v_1+1$ bits of identity "0", followed by $r_1+1$ bits of identity "1", followed by $v_2+1$ bits of identity "0", followed by r2+1 bits of identity "1", repeatedly, for i=1,2, . . . n, adding $v_i+1$ bits of identity "0" followed by $r_i+1$ bits of identity "1"; then (iii) transposing $B_u$ into $C_u$ using the shared secret transposition key, $K_t$: $C_u$=Transposition($B_u$, $K_t$); then (iv) passing $C_u$ to the recipient;

Performing, by the recipient: (v) a reverse-transposition $C_u$ to $B_u$ using the shared transposition key $K_t$; then (vi) decoding $B_u$ to $B_b$ by re-constructing each substring $b_i$ for i=1,2, . . . n by counting the number of "0" bits in the i-th substring comprised of bits of identity "0" in $B_u$, which is $v_i+1$, then writing $v_i$ in binary arithmetic, then concatenating left side $r_i$ leading zeros, where $r_i$ is given by the number of bits in the i-th substring of bits of value "1" in $B_u$ which is $r_i+1$;

Concatenating, by the recipient, the constructed n strings $b_1, b_2, \ldots b_n$ to the original $B_b = b_1 \| b_2 \| \ldots b_n$.

2. The method of claim 1, further constructing, by the transmitter, two strings, $B_v$ and $B_r$, wherein $B_v$ is constructed by listing $v_1+1$ bits of identity "0", followed by $v_2$ bits of identity "1", followed by substrings of $v_i+1$ bits, for i=3,4, ... n, where for an even i the bits are of identity "1" and for an odd i the bits are of identity "0", and wherein $B_r$ is constructed by listing $r_1+1$ bits of identity "0", followed by $r_2$ bits if identity "1", followed by substrings of $r_i+1$ bits, for i=3,4, ... n, where for an even i the bits are of identity "1" and for an odd i the bits are of identity "0"; transposing $B_v$ to $C_v$ using the shared transposition key, $K_t$, and transposing $B_r$ to $C_r$ using the shared transposition key, $K_t$; communicating $C_v$ and $C_r$ to the recipient; reverse-transposes, by the recipient, $C_v$ and $C_r$ to $B_v$ and $B_r$ respectively; extracting from $B_v$ the values $v_1, v_2, \ldots v_n$, and extracting from $B_r$ the values $r_1, r_2, \ldots r_n$; and reconstructing $B_b$.

3. The method of claim 1, wherein the n substrings $b_1, b_2, \ldots b_n$ are of equal size $|b_i|=q$ for i=1,2, ... n, where q is a positive integer, and wherein the transmitter and the recipient share an alphabet A, comprised of $2^t$ letters: $L_1, L_2, \ldots L_2^t$, where t is a positive integer, and t<q, and wherein the transmitter and the recipient agree on how to encode an arbitrary bit string $B_b$ using A and converting $B_b$ to $B_h$, written with the letters in A, and wherein the transmitter transmits to the recipient $B_h$ in a form of a ciphertext $C_u$, computed from $B_b$ as follows:

encoding $B_b$ to $B_h$, by the transmitter, with that at least two letters $L_i$, and $L_j$ in A, where A is comprising $2^t$ letters identified as $L_l$, l=1, 2, 3, ..., $2^t$; $L_i$, and $L_j$ are assigned to represent two or more of the possible $2^q$ distinct strings in $B_b$ by setting one such q-bits size substring as concatenation of two $L_i$: $L_iL_i$, and a second such q-bits size substring as a concatenation of three $L_i$ letters: $L_iL_iL_i$, and the k-th such substring as a string of (k+1) consecutive $L_i$, and where two consecutive substrings comprised of letters $L_i$ is separated by interjecting letter $L_j$ where j≠i between them, and by setting other such q-bits size substring as concatenation of two $L_j$: $L_jL_j$, and another such q-bits size substring as a concatenation of three $L_j$ letters: $L_jL_jL_j$, and the k'-th such substring as a string of (k'+1) consecutive $L_j$, and where two consecutive substrings comprised of letters $L_j$ is separated by interjecting letter $L_i$, where j≠i between them; and representing $B_b$ by a string of letters in alphabet A, which is regarded as the hybrid encoding of $B_b$, namely $B_h$, for transposing using the shared transposition key $K_t$ to $C_h$=Transposition($B_h$, $K_t$), then communicating $C_h$ to the recipient;

applying, by the recipient, the shared transposition key $K_t$ to reverse-transpose $C_h$ to $B_h$: $B_h$=Reverse-transpose ($C_h$, $K_t$); and reverse decoding $B_h$ to $B_b$, using the shared method for encoding $B_b$ to $B_h$.

* * * * *